(12) United States Patent
Johar et al.

(10) Patent No.: US 10,187,650 B2
(45) Date of Patent: Jan. 22, 2019

(54) VIDEO ENCODERS/DECODERS AND VIDEO ENCODING/DECODING METHODS FOR VIDEO SURVEILLANCE APPLICATIONS

(71) Applicant: STMicroelectronics International N.V., Amsterdam (NL)

(72) Inventors: Sumit Johar, New Delhi (IN); SurinderPal Singh, Noida (IN)

(73) Assignee: STMICROELECTRONICS INTERNATIONAL N.V., Schiphol (NL)

( * ) Notice: Subject to any disclaimer, the term of this patent is extended or adjusted under 35 U.S.C. 154(b) by 477 days.

(21) Appl. No.: 14/306,673

(22) Filed: Jun. 17, 2014

(65) Prior Publication Data

US 2015/0365693 A1  Dec. 17, 2015

(51) Int. Cl.
*H04N 19/433* (2014.01)

(52) U.S. Cl.
CPC .................. *H04N 19/433* (2014.11)

(58) Field of Classification Search
CPC ......... H04N 21/2662; H04N 21/44004; H04N 21/8451; H04N 21/440218; H04N 21/6336; H04N 21/44016
See application file for complete search history.

(56) References Cited

U.S. PATENT DOCUMENTS

| | | | | | |
|---|---|---|---|---|---|
| 5,576,767 | A | * | 11/1996 | Lee | H04N 19/139 375/240.14 |
| 5,903,313 | A | * | 5/1999 | Tucker | H04N 19/51 348/699 |
| 5,910,827 | A | * | 6/1999 | Kwan | H04N 19/895 375/240.27 |
| 8,406,292 | B2 | * | 3/2013 | Shimada | G11B 27/034 375/240.01 |
| 8,699,581 | B2 | * | 4/2014 | Koyabu | G11B 27/005 375/240.12 |
| 8,761,266 | B2 | * | 6/2014 | Rodriguez | H04N 19/00927 375/240.27 |
| 8,886,022 | B2 | * | 11/2014 | Rodriguez | H04N 5/76 386/343 |
| 2010/0074340 | A1 | * | 3/2010 | Luo | H04N 21/23424 375/240.25 |
| 2010/0130136 | A1 | * | 5/2010 | Sepehri-Nik | G06Q 30/02 455/67.11 |

(Continued)

OTHER PUBLICATIONS

Sullivan et al. IEEE Transactions on RCUITS and Systems for Video Technology, vol. 22, No. 12, Dec. 2012 1649 "Overview of the High Efficiency Video Coding (HEVC) Standard" Dec. 2012.*

*Primary Examiner* — Frank F Huang
(74) *Attorney, Agent, or Firm* — Slater Matsil, LLP (57) ABSTRACT

Video encoders and decoders and video encoding and decoding methods are provided. A video encoder includes an input buffer configured to receive a video data stream and to supply current frame data, a frame buffer configured to store reconstructed frame data, and an encoder circuit configured to read reference frame data from the frame buffer, to encode the current frame data received from the input buffer using the reference frame data and to write the reconstructed frame data to the frame buffer. The encoder circuit may be configured to write the reconstructed frame data by overwriting the reference frame data in the frame buffer.

12 Claims, 7 Drawing Sheets

(56) References Cited

U.S. PATENT DOCUMENTS

2010/0167689 A1* 7/2010 Sepehri-Nik ....... H04M 3/5158
455/405
2013/0272430 A1* 10/2013 Sullivan ................ H04N 19/70
375/240.26

* cited by examiner

VIDEO ENCODERS/DECODERS AND VIDEO ENCODING/DECODING METHODS FOR VIDEO SURVEILLANCE APPLICATIONS

BACKGROUND

Technical Field

This disclosure relates to video encoders and video encoding methods. This disclosure also relates to video decoders and video decoding methods. More particularly, the disclosure relates to low complexity, low power and low cost video encoders and decoders and video encoding and decoding methods.

Discussion of Related Art

Video surveillance is widely used for security and other applications. A video camera is directed at an area under surveillance, and a series of images is recorded. The recorded images can be retrieved and viewed if an event of interest occurs in the area under surveillance. The recorded images can be saved for a prescribed time or indefinitely.

As is known, storage of video image data requires a large storage capacity, since the image data has a large volume and images may be recorded for an extended period. Data compression techniques may be utilized to reduce storage requirements. In particular, encoding techniques may be utilized to store changes between successive frames of the image data rather than multiple frames with the same or mostly the same data. Known encoding algorithms may determine movement between frames by calculating a motion vector which represents the direction and amount of movement of an object between frames. Such algorithms typically compare a current frame to a previous frame and require random access to the previous frame data in order to calculate the motion vector. As such, conventional video encoding circuitry utilizes a first frame buffer for storage of previous frame data and a second frame buffer for storage of reconstructed frame data. Conventional video encoding techniques are relatively complex and costly for use in video surveillance applications.

It is desirable to provide video encoders and video encoding methods for video surveillance applications which have low cost, low complexity and/or low power consumption.

SUMMARY

The inventors have recognized that in video surveillance applications the camera is typically stationary for long periods of time. Further, the area viewed by the camera is likely to be stationary or to include one or more slowly-moving objects. In addition, image quality may not be a prime concern in video surveillance applications. The inventors have further recognized that frame buffers account for a large part of the chip area and power consumption in conventional video encoders. Based on these considerations, the inventors have recognized that by appropriate choice of encoding routines to meet typical video surveillance requirements, a single frame buffer can be utilized. As a result, chip area, cost and/or power consumption can be reduced in comparison with conventional video encoders.

In one aspect, a video encoder comprises an input buffer configured to receive a video data stream and to supply current frame data, a frame buffer configured to store reconstructed frame data, and an encoder circuit configured to read reference frame data from the frame buffer, to encode the current frame data received from the input buffer using the reference frame data and to write reconstructed frame data to the frame buffer.

In some embodiments, the encoder circuit is configured to read the reference frame data from a specified location in the frame buffer and to write the reconstructed frame data to the specified location in the frame buffer.

In some embodiments, the encoder circuit is configured to write reconstructed frame data to the frame buffer by overwriting the reference frame data in the frame buffer.

In some embodiments, the encoder circuit is configured to read macroblocks of the reference frame data from the frame buffer and to write macroblocks of the reconstructed frame data to the frame buffer.

In some embodiments, the encoder circuit is configured to encode the current frame data according to a zero motion vector algorithm.

In some embodiments, the input buffer comprises a double buffer configured to simultaneously receive the video data stream and supply the current frame data.

In some embodiments, the double buffer includes a first buffer area and a second buffer area, and the input buffer further includes a multiplexer having inputs respectively coupled to the first and second buffer areas and a double buffer controller configured to control operation of the double buffer and the multiplexer.

In some embodiments, the first buffer area and the second buffer area of the double buffer are each configured to store a row of macroblocks of the current frame data.

In another aspect, a method for encoding video data comprises receiving, by an input buffer, a video data stream, supplying, by the input buffer, current frame data to an encoder circuit, reading, by the encoder circuit, reference frame data from a frame buffer, encoding, by the encoder circuit, the current frame data using the reference frame data to provide reconstructed frame data, and writing, by the encoder circuit, the reconstructed frame data to the frame buffer.

In another aspect, a video decoder comprises a frame buffer configured to store reconstructed frame data, and a decoder circuit configured to read reference frame data from the frame buffer, to decode current frame encoded data using the reference frame data and to write reconstructed frame data to the frame buffer.

In another aspect, a method for decoding video data comprises receiving, by a decoder circuit, current frame encoded data, reading, by the decoder circuit, reference frame data from a frame buffer, decoding, by the decoder circuit, the current frame encoded data using the reference frame data to provide reconstructed frame data, and writing, by the decoder circuit, the reconstructed frame data to the frame buffer.

BRIEF DESCRIPTION OF THE DRAWINGS

For a better understanding of the disclosure, reference is made to the accompanying drawings, which are incorporated herein by reference and in which.

DETAILED DESCRIPTION

This disclosure describes low-cost, low-complexity and/or low power consumption video encoders and decoders and video encoding and decoding methods, typically used for video surveillance applications. It has been observed that cameras used for video surveillance applications are generally stationary for long time periods. In addition, the area being viewed by the camera may be stationary for long periods or may include a subject, such as a person, that is generally slow-moving with respect to the camera position. Image capture quality may be degraded due to poor sensor quality, environmental conditions, lighting and the like. Given these constraints, an acceptable tradeoff between compression efficiency, power consumption, chip area and the like may be achieved by selecting a configuration of video compression routines and configuring a video encoder to execute the selected video compression routines.

Figure 1:
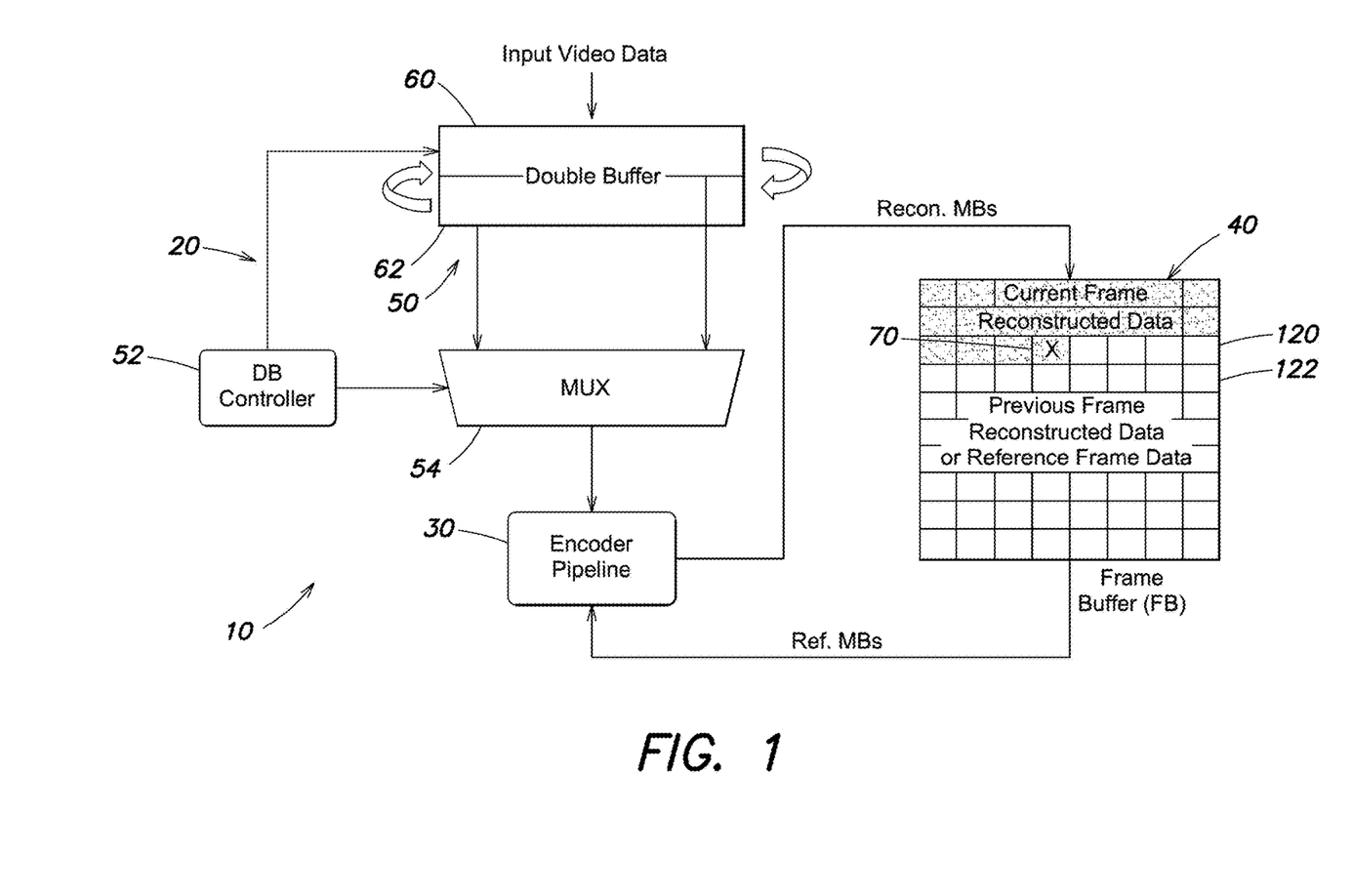
FIG. 1 is a schematic block diagram of a video encoder in accordance with embodiments.

A schematic block diagram of a video encoder in accordance with embodiments is shown in FIG. 1. As shown, a video encoder 10 includes an input buffer 20, an encoder circuit implemented as an encoder pipeline 30, and a frame buffer 40. The input buffer 20 receives an input video data stream from a camera or other video source (not shown) and supplies current frame data to encoder pipeline 30. The frame buffer 40 provides reference frame data to the encoder pipeline 30 and stores reconstructed frame data generated by encoder pipeline 30. The frame buffer 40 includes a frame buffer controller (not shown) which controls reading and writing of data in frame buffer 40, as requested by encoder pipeline 30.

As discussed below, the encoder 10 includes a single frame buffer and the reconstructed frame data for the current frame overwrites the reference frame data during the encoding process. The encoder pipeline 30 receives current frame data from input buffer 20 and receives reference frame data from frame buffer 40. The encoder pipeline performs encoding based on the current frame data and the reference frame data, according to a selected video encoding routine or routines, and supplies reconstructed frame data to frame buffer 40 for storage.

The input buffer 20 may be configured as a double buffer. In the embodiment of FIG. 1, the input buffer 20 includes a double buffer 50, a double buffer controller 52 and a multiplexer 54. The double buffer 50 may include a first buffer area 60 and a second buffer area 62. In one example, first buffer area 60 and second buffer area 62 each include a macroblock row of video data, so that current frame data can be supplied to encoder pipeline 30 in the form of macroblocks. In one example, the macroblocks can have dimensions of 16×16 pixels, and each buffer area 60, 62 stores 16 lines of video data.

The output of first buffer area 60 is provided to a first input of multiplexer 54, and the output of second buffer area 62 is provided to a second input of multiplexer 54. The selected input of multiplexer 54 is supplied to encoder pipeline 30 as macroblocks of current frame data. The double buffer controller 52 controls double buffer 50 and multiplexer 54 to stream input video data into one of the buffer areas and to simultaneously supply current frame data to encoder pipeline 30 from the other of the buffer areas.

In operation, the double buffer controller 52 fetches pixel lines from a camera interface (not shown). The pixels arrive in raster scan order as input video data. The double buffer controller 60 arranges the pixel lines into macroblock rows in one of the buffer areas 60, 62. In the example of FIG. 1, each macroblock row is 16 pixel lines. As soon as one macroblock row of 16 pixel lines is available in the double buffer 50, the double buffer controller 52 supplies the macroblock row to the encoder pipeline 30 through the multiplexer 54. At the same time, the double buffer controller 52 fills the second buffer area with incoming pixels from the camera interface. The double buffer configuration enables input video data to be streamed into double buffer 50 at the same time that macroblock rows are supplied to encoder pipeline 30.

The encoder pipeline 30 encodes the macroblock row data using one or more video compression algorithms to generate reconstructed macroblock data, and writes the reconstructed macroblock data into the frame buffer 40. Before the first frame is encoded, the frame buffer 40 is empty and the reconstructed macroblock data for the first frame is written into the empty frame buffer. As subsequent frames are encoded, the reconstructed macroblocks overwrite macroblocks in the frame buffer which correspond to the reference frame.

In embodiments, the encoder pipeline 30 uses a zero motion vector (ZMV) routine. The zero motion vector routine assumes zero motion in the scene viewed by the camera. Use of the zero motion vector routine avoids the need for accessing macroblock data in frame buffer 40 that may have already been overwritten with the current frame reconstructed macroblock data. In a case where movement does occur in the scene viewed by the camera, the encoder pipeline 30 may select an encoding mode different from the ZMV routine. For example, the encoder pipeline 30 may select an intra-encoding mode that results in minimum bit rate and best quality.

The encoder pipeline 30 uses the zero motion vector routine to perform encoding. The encoder pipeline 30 fetches from frame buffer 40 a reference macroblock of the previous reconstructed frame, which serves as a reference frame for the current frame being encoded. The macroblock data is then encoded and reconstructed, and the reconstructed macroblock data can be written to the same location in the frame buffer 40. Referring again to FIG. 1, a location 70, marked "X" in frame buffer 40, provides reference frame data to encoder pipeline 30. Then, after encoder pipeline 30 has generated reconstructed macroblock data based on the reference frame macroblock data from location 70, the reconstructed macroblock data is written to location 70 in frame buffer 40. As a result, the reconstructed macroblock data overwrites the reference frame macroblock data. Thus, a single frame buffer 40 is used for reference frame macroblock data and for current frame reconstructed macroblock data. The above sequence is repeated for subsequent macroblocks until the frame buffer is filled with current frame reconstructed macroblock data.

In some embodiments, the encoder pipeline 30 may be configured to encode the current frame data according to the H.264 video compression standard. However, encoder pipeline 30 is not limited to the H.264 video compression standard and may utilize other video standards, such as HEVC and MPEG-2, as well as video encoding schemes such as Google's VPx.

Figure 2:
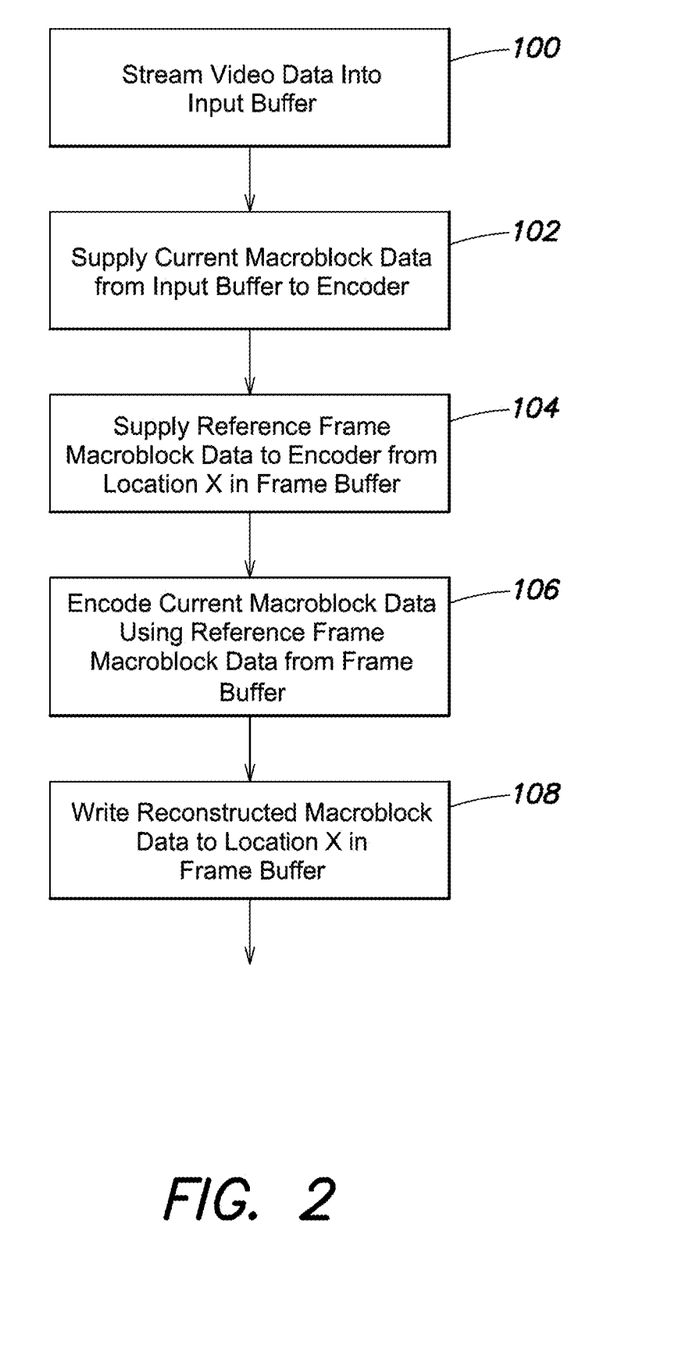
FIG. 2 is a flow chart of a process for encoding video data in accordance with embodiments.

A flow chart of a process for encoding video data in accordance with embodiments is shown in FIG. 2. The process of FIG. 2 substantially reflects the process described above. In general, the process may include acts in addition to the acts shown in FIG. 2, and the acts shown in FIG. 2 may be performed in a different order.

In act 100, video data is streamed into input buffer 20. When a row of macroblock data is present in input buffer 20, current frame macroblock data is supplied from input buffer 20 to encoder pipeline 30 in act 102. As described above, the double buffer configuration enables video data for a first macroblock row to be streamed into the input buffer at the same time that video data for a second macroblock row is supplied from the input buffer to the encoder pipeline 30.

In act 104, reference frame macroblock data is read from frame buffer 40 and is supplied to encoder pipeline 30. The reference frame macroblock data is the reconstructed macroblock data written to the frame buffer after encoding a previous frame. The reference frame macroblock data is read from location 70, for example, in frame buffer 40.

In act 106, the encoder pipeline 30 encodes the current frame macroblock data received from the input buffer 20 using an encoding algorithm and the corresponding reference frame macroblock data fetched from location 70 in frame buffer 40. The encoder pipeline 30 thereby generates reconstructed current frame data in the form of reconstructed macroblock data and writes the reconstructed macroblock data to location 70 in frame buffer 40 in act 108.

The encoding process is repeated for each macroblock in the current frame until the current frame has been encoded. In particular, the process encodes successive current frame macroblock data in a macroblock row of input buffer 20, according to the selected compression algorithm, using corresponding reference frame macroblock data from frame buffer 40 and writes reconstructed macroblock data to successive locations in macroblock row 120 of frame buffer 40. The process then proceeds to a next macroblock row 122, and so on, until the current frame has been encoded.

The process is then repeated for subsequent frames, with the current frame reconstructed macroblock data becoming the reference frame data.

Figure 3:
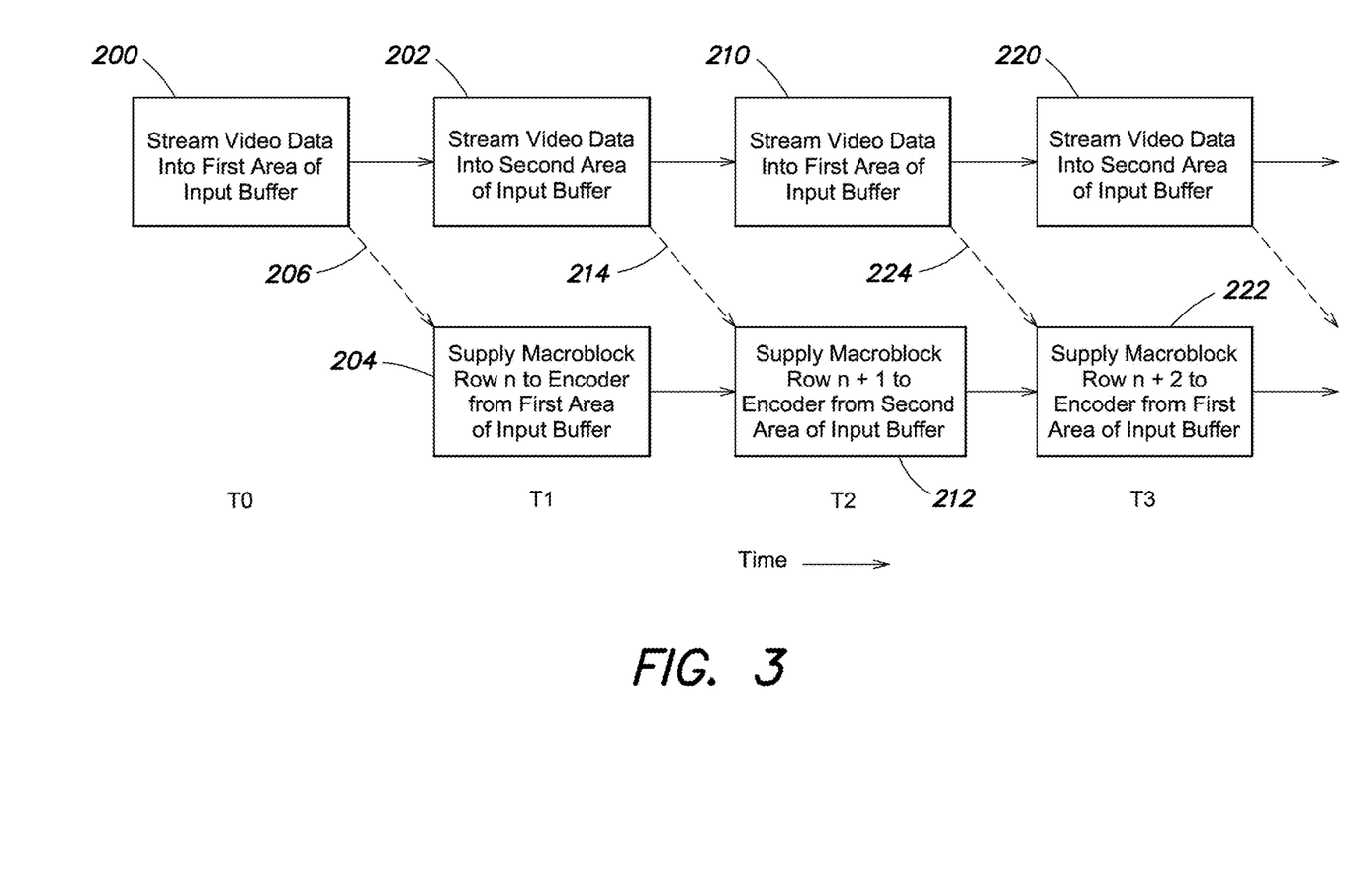
FIG. 3 is a timing diagram that illustrates operation of the input buffer of FIG. 1.

A timing diagram that illustrates operation of the input buffer of FIG. 1 is shown in FIG. 3. In FIG. 3, time increases along the horizontal direction. FIG. 3 illustrates operation of the double buffer configuration shown in FIG. 1. During a first time period T0, video data is streamed into the first buffer area 60 of the double buffer 50 in block 200. In the example of FIG. 3, video data is streamed into first buffer area 60 in block 200, and second buffer area 62 is empty.

During a second time period T1, video data is streamed into the second buffer area 62 of double buffer 50 in block 202. Also during time period T1, a row n of macroblock data is supplied to encoder pipeline 30 from the first buffer area 60 in block 204. As indicated by the dashed line 206, the data that was streamed into first buffer area 60 during time period T0 is supplied to encoder pipeline 30 during time period T1.

During a third time period T2, video data is streamed into the first buffer area 60 of double buffer 50 in block 210. Also during time period T2, a row n+1 of macroblock data is supplied to encoder pipeline 30 from the second buffer area 62 of double buffer 50 in block 212. As indicated by dashed line 214, the video data that was streamed into the second buffer area 62 during time period T1 is supplied to encoder pipeline 30 during time period T2.

Similarly, during a fourth time period T3, video data is streamed into the second buffer area 62 of double buffer 50 in block 220. Also during time period T3, a row n+2 of macroblock data is supplied to encoder pipeline 30 from the first buffer area 60 of double buffer 50 in block 222. As indicated by dashed line 224, the video data that was streamed into the first buffer area 60 during time period T2 is supplied to encoder pipeline 30 during time period T3. This process continues to the end of a frame of video data and then is repeated for subsequent frames.

It can be seen that the streaming of video data into the double buffer and the supplying macroblock data to encoder pipeline 30 alternates between first buffer area 60 and second buffer area 62 in subsequent time periods. The operation illustrated in FIG. 3 and described above is controlled by the double buffer controller 52.

Figure 4:
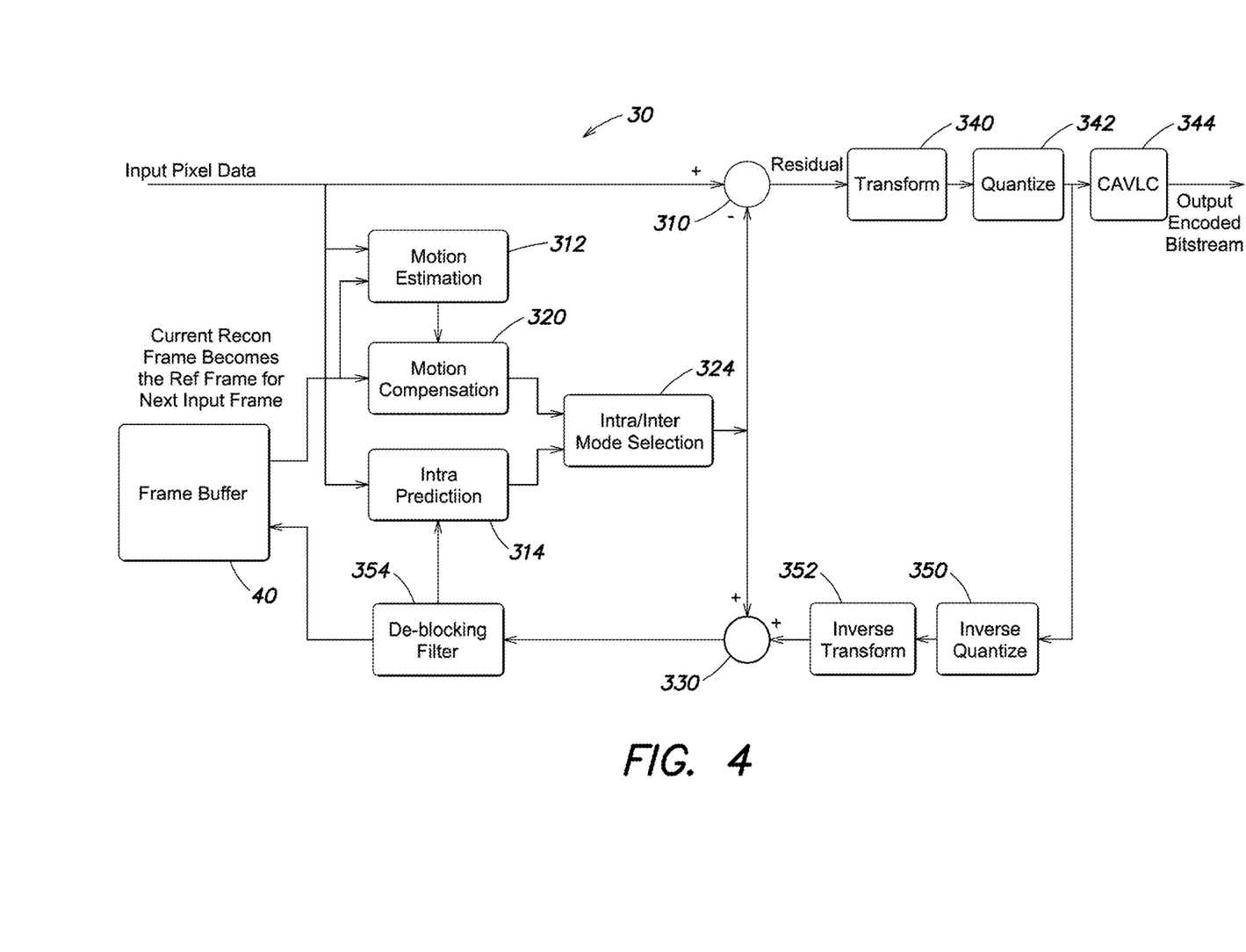
FIG. 4 is a schematic block diagram of an encoder circuit, in accordance with embodiments.

A schematic block diagram of encoder pipeline 30 in accordance with embodiments in shown in FIG. 4. The encoder pipeline 30 receives input pixel data from multiplexer 54 (FIG. 1) and receives reference frame data from frame buffer 40. The encoder pipeline 30 supplies reconstructed frame data to frame buffer 40 for storage and supplies an output encoded bitstream.

The input pixel data is supplied to a first input of a subtracting section 310, to a motion estimation section 312 and to an intra prediction section 314. The reference frame data from frame buffer 40 is supplied to the motion estimation section 312 and to a motion compensation section 320. The outputs of motion compensation section 320 and intra prediction section 314 are supplied to inputs of an intra/inter mode selection section 324. The output of intra/inter mode selection section 324 is supplied to a second input of subtracting section 310 and to a first input of a summing section 330.

An output of subtracting section 310, including residual information, is supplied through a transform section 340 and a quantize section 342 to a CAVLC (context adaptive variable length coding) section 344. The CAVLC section 344 provides the output encoded bitstream. The output of quantize section 342 is supplied through an inverse quantize section 350 and an inverse transform section 352 to a second input of summing section 330. The output of summing section 330 is supplied to an input of intra prediction section 314 and to an input of a deblocking filter 354. The output of deblocking filter 354 is supplied as reconstructed frame data to frame buffer 40.

The sections of encoder pipeline 30 as shown in FIG. 4 and described above may perform known encoding functions. The encoder pipeline 30 may be implemented as a pipelined processor programmed to execute the encoding functions.

Figure 5:
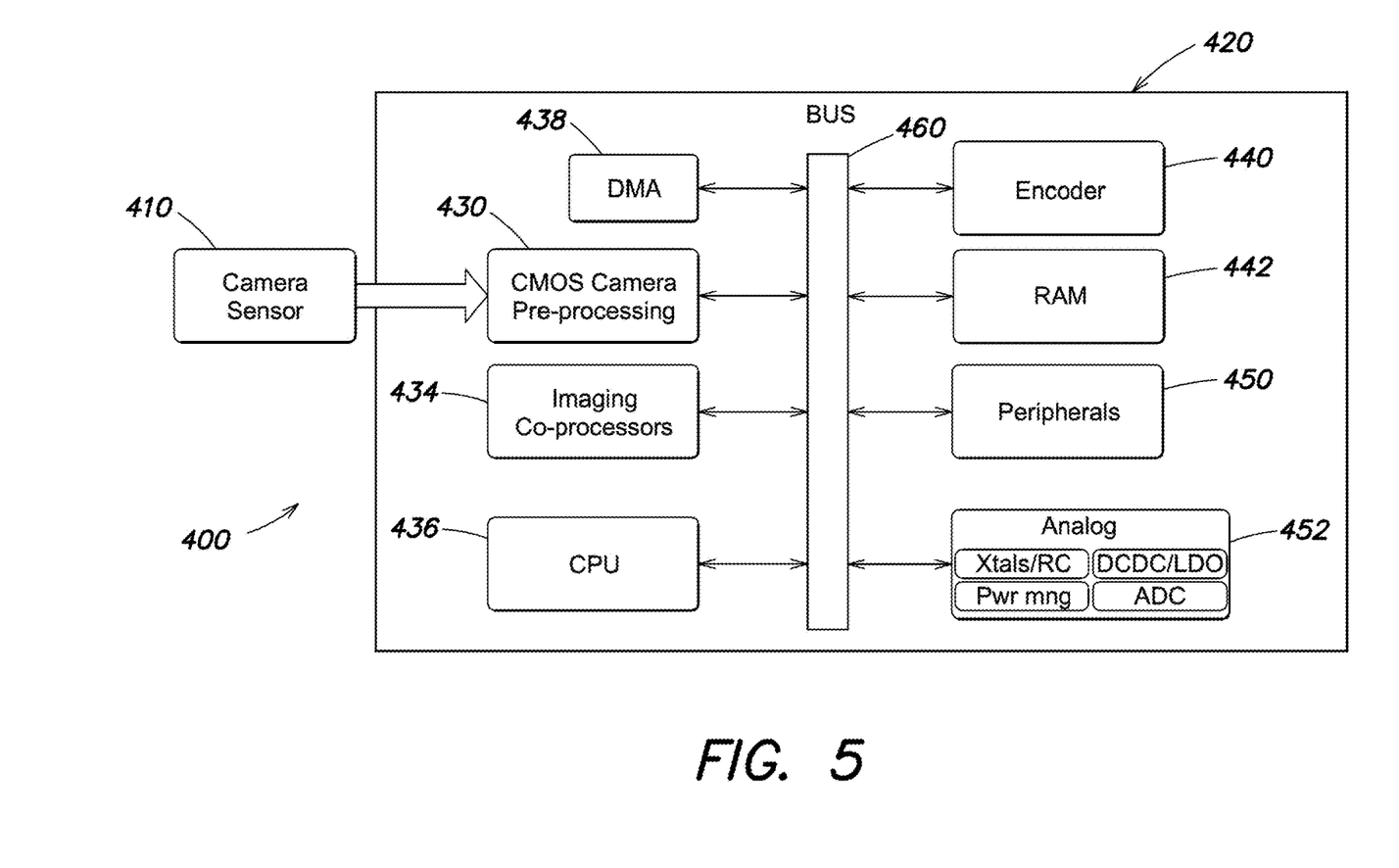
FIG. 5 is a schematic block diagram of a camera system incorporating a video encoder in accordance with embodiments.

A block diagram of a camera system 400 in accordance with embodiments is shown in FIG. 5. The camera system includes a camera sensor 410 coupled to a camera processing block 420. The camera processing block 420 may be implemented using a SoC (System on Chip) architecture. The camera processing unit 420 may include a CMOS camera preprocessing block 430 coupled to camera sensor 410, imaging coprocessors 434, a CPU (central processing unit) 436, a DMA (direct memory access) unit 438, an encoder 440 and RAM (random access memory) 442. System components external to the camera processing chip may include peripherals 450 and analog components 452. The components of the camera processing unit 420 are interconnected by a bus 460.

In FIG. 5, encoder 440 corresponds to the encoder 10 shown in FIG. 1 and described above. The encoder 440 receives input video data from CMOS camera preprocessing block 430 and supplies the output encoded bitstream to RAM 442 for storage.

Figure 6:
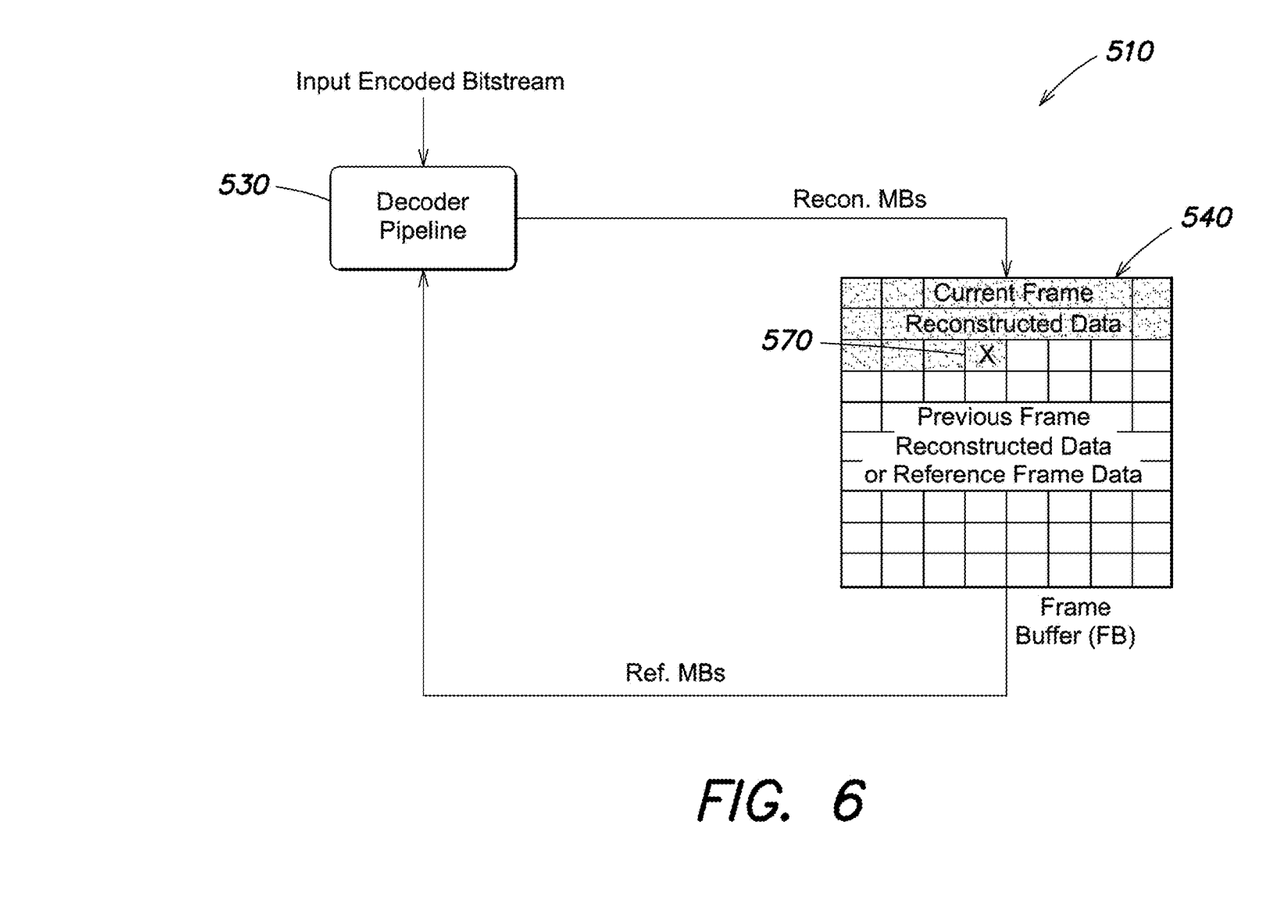
FIG. 6 is a schematic block diagram of a video decoder in accordance with embodiments.

It will be understood that the encoding techniques described above can be applied to decoding of an encoded bitstream. A schematic block diagram of a video decoder in accordance with embodiments is shown in FIG. 6. As shown, a video decoder 510 includes a decoder circuit implemented as a decoder pipeline 530, and a frame buffer 540. The decoder pipeline 530 receives an input encoded bitstream, typically from a memory. The frame buffer 540 provides reference frame data to the decoder pipeline 530 and stores reconstructed frame data generated by the decoder pipeline 530.

The decoder 510 includes a single frame buffer, and the reconstructed frame data for the current frame overwrites the reference frame data during the decoding process. The decoder pipeline 530 receives the input encoded bitstream and receives reference frame data from frame buffer 540. The decoder pipeline 530 performs decoding based on the encoded bit stream and the reference frame data, according to selected video decoding routines, and supplies reconstructed frame data to frame buffer 540 for storage.

The decoder pipeline 530 decodes the macroblock row data using one or more decoding algorithms to generate reconstructed macroblock data, and writes the reconstructed macroblock data into the frame buffer 540. The decoding algorithms may be the inverse of the encoding algorithms used to encode the input data. Before the first frame is decoded, the frame buffer 540 is empty and the reconstructed macroblock data for the first frame is written into the empty frame buffer. As subsequent frames are decoded, the reconstructed macroblocks overwrite macroblocks in the frame buffer which correspond to the reference frame.

The decoder pipeline 530 fetches from frame buffer 540 a reference macroblock of the previous reconstructed frame, which serves as a reference frame for the current frame being decoded. The macroblock data is then decoded and reconstructed, and the reconstructed macroblock data can be written to the same location in frame buffer 540. As shown in FIG. 6, a location 570, marked "X" in frame buffer 540, provides reference frame data to decoder pipeline 530. Then, after decoder pipeline 530 has generated reconstructed macroblock data based on the reference frame macroblock data from location 570, the reconstructed macroblock data is written to location 570 in frame buffer 540. As a result, the reconstructed macroblock data overwrites the reference macroblock data. Thus, a single frame buffer 540 is used for reference frame macroblock data and for current frame reconstructed macroblock data. The above sequence is repeated for subsequent macroblocks until the frame buffer is filled with current frame reconstructed macroblock data.

Figure 7:
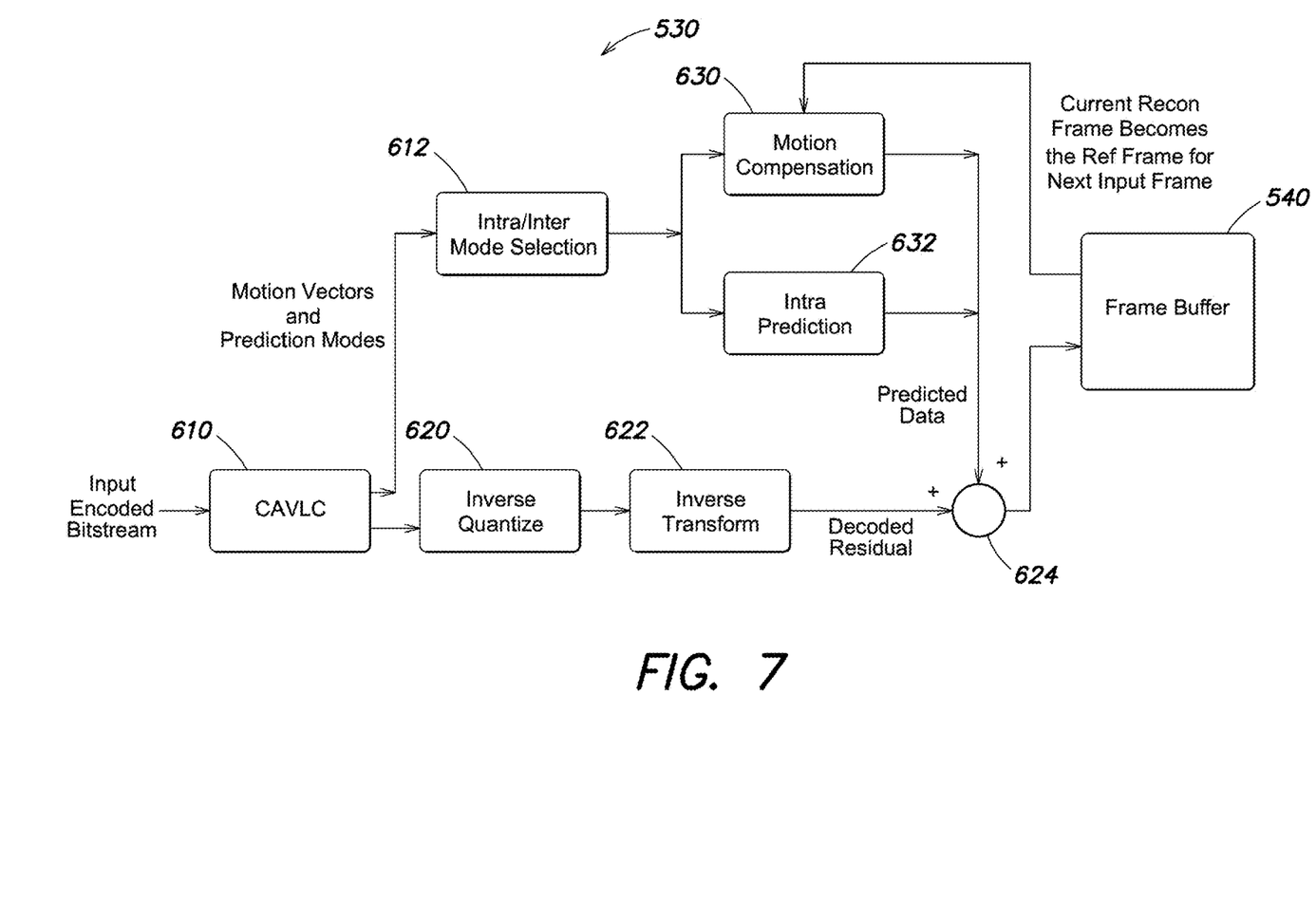
FIG. 7 is a schematic block diagram of a decoder circuit, in accordance with embodiments.

A schematic block diagram of decoder pipeline 530 in accordance with embodiments is shown in FIG. 7. The encoded bitstream is received by a CAVLC section 610. A first output of CAVLC section 610, including motion vectors and prediction modes, is supplied to an intra/inter mode selection section 612. A second output of CAVLC section 610 is supplied through an inverse quantize section 620 and an inverse transform section 622 as decoded residual information to a first input of a summing section 624. A motion compensation section 630 receives an output of intra/inter mode selection section 612 and receives reference frame data from frame buffer 540. An intra prediction section 632 receives an output from intra/inter mode selection section 612. The outputs of motion compensation section 630 and intra prediction section 632 are provided to a second input of adding section 624 as predicted data. An output of summing section 624 is provided to frame buffer 540 as reconstructed frame data.

Having thus described at least one illustrative embodiment of the invention, various alterations, modifications, and improvements will readily occur to those skilled in the art. Such alterations, modifications, and improvements are intended to be within the spirit and scope of the invention. Accordingly, the foregoing description is by way of example only and is not intended as limiting. The invention is limited only as defined in the following claims and the equivalents thereto.

What is claimed is:

1. A video encoder comprising:
an input buffer configured to receive a video data stream, and supply current frame data;
a frame buffer configured to store reconstructed frame data, wherein the frame buffer comprises a single-frame buffer configured to store reference frame data comprising a plurality of reference macroblocks and to store current frame reconstructed data comprising a plurality of reconstructed macroblocks; and
an encoder pipeline circuit configured to, in a macroblock-by-macroblock pipelined fashion for each reference macroblock of the reference frame data:
read a first reference macroblock of the plurality of reference macroblocks of the reference frame data from a specified location in the frame buffer, wherein other reference macroblocks of the reference frame data stored in the frame buffer are not read when the first reference macroblock is read;
encode a first current macroblock of the current frame data received from the input buffer using the first reference macroblock to generate a first reconstructed macroblock of the plurality of reconstructed macroblocks;
write the first reconstructed macroblock to the same specified location from which the first reference macroblock was read in the frame buffer, wherein the first reconstructed macroblock of the current frame reconstructed data and the other reference macroblocks of the reference frame data are concurrently stored in the single-frame buffer; and
repeat the reading, encoding, and writing steps for each of the other reference macroblocks of the plurality of reference macroblocks on a macroblock-by-macroblock basis until the single-frame buffer is filled with the current frame reconstructed data.

2. The video encoder as defined in claim 1, wherein the encoder pipeline circuit is configured to write the first reconstructed macroblock by overwriting the first reference macroblock in the frame buffer.

3. A method for encoding video data comprising:
receiving, by an input buffer, a surveillance video data stream;
supplying, by the input buffer, current frame data to an encoder pipeline circuit;
reading in a macroblock-by-macroblock pipelined fashion, by the encoder pipeline circuit, a first reference macroblock of a plurality of reference macroblocks of reference frame data from a specified location in a frame buffer, wherein other reference macroblocks of the reference frame data stored in the frame buffer are not read when the first reference macroblock is read;
encoding in the macroblock-by-macroblock pipelined fashion, by the encoder pipeline circuit, a first current macroblock of the current frame data using the first reference macroblock to provide a first reconstructed macroblock of a plurality of reconstructed macroblocks of reconstructed frame data; and writing in the macroblock-by-macroblock pipelined fashion, by the encoder pipeline circuit, the first reconstructed macroblock to the same specified location from which the first reference macroblock was read in the frame buffer, wherein the frame buffer comprises a single-frame buffer that concurrently stores the first reconstructed macroblock of the current frame data and the other reference macroblocks of the reference frame data.

4. The method for encoding video data as defined in claim 3, wherein writing the first reconstructed macroblock to the frame buffer comprises overwriting the first reference macroblock in the frame buffer.

5. The method for encoding video data as defined in claim 3, wherein writing the first reconstructed macroblock to the frame buffer comprises writing the first reconstructed macroblock data to the frame buffer while not overwriting the other reference macroblocks of the reference frame data stored in the frame buffer.

6. The method for encoding video data as defined in claim 3, wherein supplying the current frame data to the encoder pipeline circuit comprises supplying macroblocks of the current frame data from the input buffer to the encoder pipeline circuit in the macroblock-by-macroblock pipelined fashion.

7. A video decoder comprising:
a frame buffer comprising a single-frame buffer configured to store reconstructed frame data and reference frame data, the reference frame data comprising a plurality of reference macroblocks; and
a decoder pipeline circuit configured to, in pipelined fashion for each reference macroblock of the reference frame data:
read a first reference macroblock of the plurality of reference macroblocks of the reference frame data from a specified location in the frame buffer, wherein other reference macroblocks of the reference frame data stored in the frame buffer are not read when the first reference macroblock is read;
decode a first current encoded macroblock of current frame encoded data using the first reference macroblock to generated a first reconstructed macroblock of a plurality of reconstructed macroblocks of current frame reconstructed data;
write the first reconstructed macroblock to the same specified location from which the first reference macroblock was read in the frame buffer, wherein the first reconstructed macroblock of the current frame reconstructed data and the other reference macroblocks of the reference frame data are concurrently stored in the single-frame buffer; and
repeat the reading, decoding, and writing steps for each of the other reference macroblocks of the plurality of reference macroblocks on a macroblock-by-macroblock basis until the single-frame buffer is filled with the current frame reconstructed data.

8. The video decoder as defined in claim 7, wherein the decoder pipeline circuit is configured to write the first reconstructed macroblock by overwriting the first reference macroblock in the frame buffer.

9. The video decoder as defined in claim 7, wherein the decoder pipeline circuit is configured to write the first reconstructed macroblock of the current frame reconstructed data to the frame buffer without overwriting the other reference macroblocks of the reference frame data stored in the frame buffer.

10. A method for decoding video data comprising:
receiving, by a decoder pipeline circuit, current frame encoded data;
reading in a macroblock-by-macroblock pipelined fashion, by the decoder pipeline circuit, a first reference macroblock of a plurality of reference macroblocks of reference frame data from a specified location in a frame buffer, wherein other reference macroblocks of the reference frame data stored in the frame buffer are not read when the first reference macroblock is read;
decoding in the macroblock-by-macroblock pipelined fashion, by the decoder pipeline circuit, a first current macroblock of the current frame encoded data using the first reference macroblock to provide a first reconstructed macroblock of a plurality of reconstructed macroblocks of reconstructed frame data; and
writing in the macroblock-by-macroblock pipelined fashion, by the decoder pipeline circuit, the first reconstructed macroblock to the same specified location from which the first reference macroblock was read in the frame buffer, wherein said frame buffer comprises a single-frame buffer that concurrently stores the first reconstructed macroblock of the current frame data and the other reference macroblocks of the reference frame data.

11. The method for decoding video data as defined in claim 10, wherein writing the first reconstructed macroblock to the frame buffer comprises overwriting the first reference macroblock in the frame buffer.

12. The method for decoding video data as defined in claim 10, wherein writing the first reconstructed macroblock to the frame buffer comprises writing the first reconstructed macroblock of the current frame reconstructed data to the frame buffer without overwriting the other reference macroblocks of the reference frame data stored in the frame buffer.

* * * * *

UNITED STATES PATENT AND TRADEMARK OFFICE
CERTIFICATE OF CORRECTION

PATENT NO. : 10,187,650 B2
APPLICATION NO. : 14/306673
DATED : January 22, 2019
INVENTOR(S) : Sumit Johar It is certified that error appears in the above-identified patent and that said Letters Patent is hereby corrected as shown below:

In the Claims

Column 9, Lines 16-17, Claim 5, delete "the first reconstructed macroblock data to the frame buffer" and insert --the first reconstructed macroblock to the frame buffer--.

Signed and Sealed this
Twelfth Day of March, 2019

Andrei Iancu
*Director of the United States Patent and Trademark Office*